Nov. 22, 1960 T. M. HUGHES, JR 2,961,135
DUCK CALL HOLDER
Filed Aug. 29, 1958
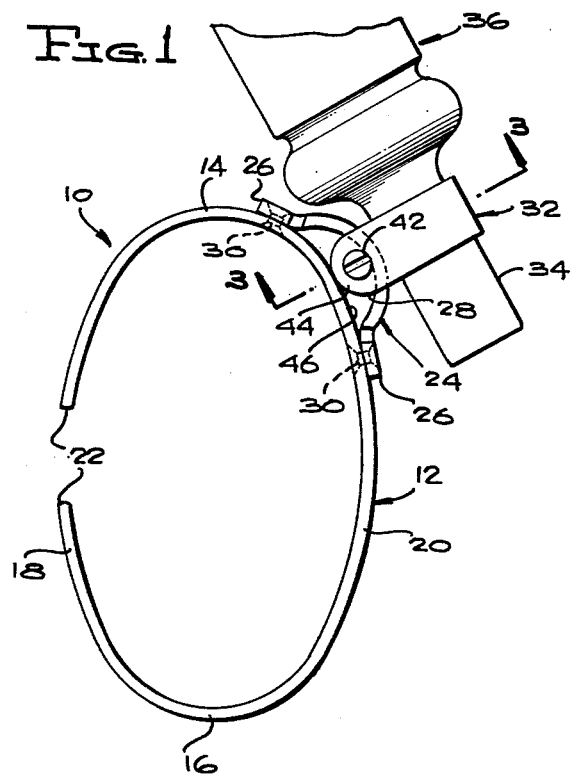
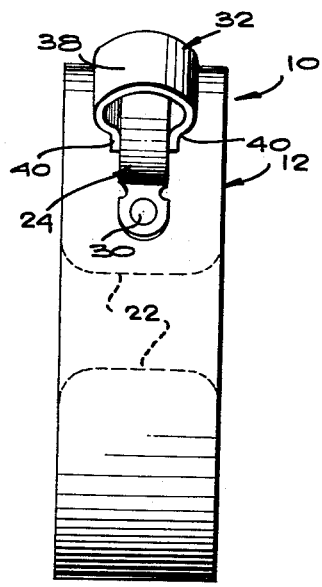
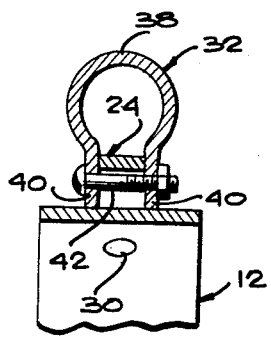
INVENTOR.
THOMAS M. HUGHES, JR.
BY
McMorrow, Berman & Davidson
ATTORNEYS

United States Patent Office 2,961,135
Patented Nov. 22, 1960

2,961,135

DUCK CALL HOLDER

Thomas M. Hughes, Jr., 1002 Brower Road, Memphis, Tenn.

Filed Aug. 29, 1958, Ser. No. 758,050

3 Claims. (Cl. 224—28)

This invention relates to a hunter's duck call holder.

The primary object of the invention is to provide a holder of this kind for embracing either hand of a hunter and holding a duck call in a secure manner preventing loss or damage to the call, and in a convenient manner enabling the hunter to have the call constantly in sight and instantly ready for use without interference with the hunter's sight alignment and manipulation of his gun.

Another object of the invention is to provide a simple and efficient holder of the character indicated above, which is readily adjustable to fit different sizes of hands, and which has thereon a pivoted mounting for a duck call, which serves to mount the duck call on the holder for swinging into and out of the position of use of the call.

Other important and advantageous features of the invention will be apparent from the following description and the accompanying drawings, wherein, for purposes of illustration only, a specific form of the invention is set forth in detail.

In the drawings:

Figure 1 is a side elevation of a holder of the invention carrying a duck call;

Figure 2 is an edge elevation taken from the right of Figure 1; and

Figure 3 is a fragmentary horizontal section taken on the line 3—3 of Figure 1.

Referring in detail to the drawings, wherein like numerals designate like parts throughout the several views, the illustrated holder, generally designated 10, comprises an oval split hand embracing band 12, which is relatively rigid but is bendable to accommodate hands of different sizes. The band 12 is preferably made of flat aluminum strip but can be made of any other suitable material. The band 12 comprises upper and lower arcuate ends 14 and 16, respectively, and longitudinally bowed outer and inner sides 18 and 20, respectively. The outer side 18 is split to provide separated terminal ends 22, while the inner side 20 is continuous and uninterrupted.

An arcuate pivot strap or yoke 24 has longitudinal and outwardly projecting and aligned ears 26 on its ends, whose sides remote from the concave side 28 of the pivot strap 24 engage spaced points on the outer surface of the band 12 in the area of the meeting of the upper arcuate end 14 and the inner side 20 of the band 12, as shown in Figure 1, and are secured to the band in suitable manner, as by means of rivets 30. As shown in Figures 2 and 3, the pivot strap or yoke 24 is preferably substantially narrower than and is centered on the band, which is relatively wide.

The holder 10 further comprises a split duck call-embracing clamp 32, adapted to embrace the mouthpiece 34 of a duck call 36, as shown in Figure 1. The clamp 32 is U-shaped and has a three-quarter circular main portion 38 which terminates at its ends in flat parallel spaced ears 40, through which extends a clamping and pivot bolt 42. The outer ends 44 of the ears 40 are rounded, as shown in Figure 1, to bear rotatably and swingably on the outer surface 46 of the band 12 beneath the yoke 24, with the part of the bolt 42 between the ears bearing rotatably against the concave inward side 28 of the yoke 24, and the ears 40 sliding against the side edges of the yoke 24.

The duck call 36 is here shown as disposed with its mouthpiece 34 extending downwardly, in a preferred arrangement relative to the holder 10. However, the call 36 can be inverted relative to the holder 10 if desired. As illustrated in Figure 1, the band 12 being circumposed on the hand of a hunter, positioning of the call 36 for use can be done simply by pressing downwardly on the call with the thumb and then cupping both hands around the lower part of the call. When the hands are separated and the thumb released from the call 36 it falls back and permits the hunter an unobstructed view and freedom for shooting.

Although there has been shown and described herein a preferred form of the invention, it is to be understood that the invention is not necessarily confined thereto, and that any change or changes in the structure of and in the relative arangements of components thereof are contemplated as being within the scope of the invention as defined by the claims appended hereto.

What is claimed is:

1. A duck call holder comprising a hand-embracing band having an outer side, a yoke fixed at its ends on said outer side and having an intermediate portion thereof spaced from said outer side, said yoke having opposed side edges, a U-shaped clamp comprising a circular bight portion and ears at the ends of the bight portion, said ears being located at opposite sides of the yoke, a clamping bolt extending through said ears and between the intermediate portion of the yoke and the outer side of the band, said bolt being adapted to be tightened to clamp said bight portion around the mouth-piece of a duck call.

2. A duck call holder comprising a hand-embracing band having an outer side, a yoke fixed at its ends on said outer side and having an intermediate portion thereof spaced from said outer side, said yoke having opposed side edges, a U-shaped clamp comprising a circular bight portion and ears at the ends of the bight portion, said ears being located at opposite sides of the yoke, a clamping bolt extending through said ears and between the intermediate portion of the yoke and the outer side of the band, said bolt being adapted to be tightened to clamp said bight portion around the mouth-piece of a duck call, said intermediate portion of the yoke being arcuate and bowed away from the outer side of the band, said bolt being freely positioned between said intermediate portion of the yoke and the outer side of the band, and said ears being engaged with opposed side edges of the yoke.

3. A duck call holder comprising a hand-embracing band having an outer side, a yoke fixed at its ends on said outer side and having an intermediate portion thereof spaced from said outer side, said yoke having opposed side edges, a U-shaped clamp comprising a circular bight portion and ears at the ends of the bight portion, said ears being located at opposite sides of the yoke, a clamping bolt extending through said ears and between the intermediate portion of the yoke and the outer side of the band, said bolt being adapted to be tightened to clamp said bight portion around the mouth-piece of a duck call, said intermediate portion of the yoke being arcuate and bowed away from the outer side of the band, said bolt being freely positioned between said intermediate portion of the yoke and the outer side of the band, and said ears being engaged with opposed side edges of the yoke, said yoke being disposed lengthwise of the band, and said ears having arcuate terminal ends bearing against the outer side of the band at opposite sides of the yoke.

References Cited in the file of this patent

UNITED STATES PATENTS

| | | |
|---|---|---|
| 303,139 | Franham | Aug. 5, 1884 |
| 1,258,077 | Worcester | Mar. 5, 1918 |
| 1,471,985 | Tower | Oct. 23, 1923 |
| 1,568,528 | Petrie | Jan. 5, 1926 |
| 1,772,439 | Garbs | Aug. 5, 1930 |
| 1,774,775 | Weitz | Sept. 2, 1930 |
| 2,351,858 | Ingalls | June 20, 1944 |
| 2,402,877 | Dial | June 25, 1946 |
| 2,555,890 | Korth | June 5, 1951 |
| 2,824,681 | Sorkin | Feb. 25, 1958 |